Figure 1:
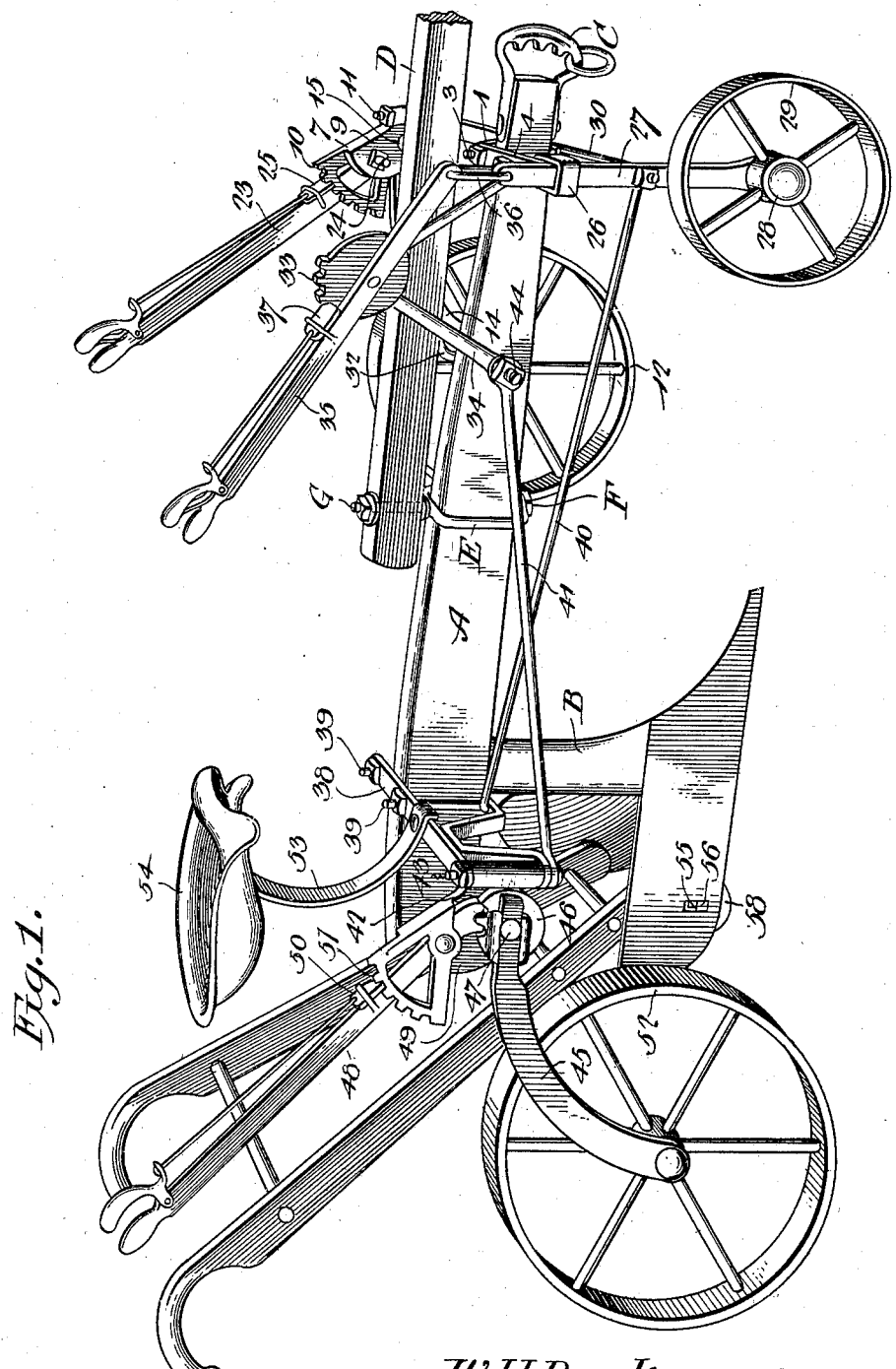

No. 655,846. Patented Aug. 14, 1900.
W. H. BRACKNEY.
RIDING ATTACHMENT FOR PLOWS.
(Application filed May 8, 1900.)
(No Model.) 2 Sheets—Sheet 1.

Witnesses
W. H. Brackney, Inventor
by C. A. Snow & Co.
Attorneys

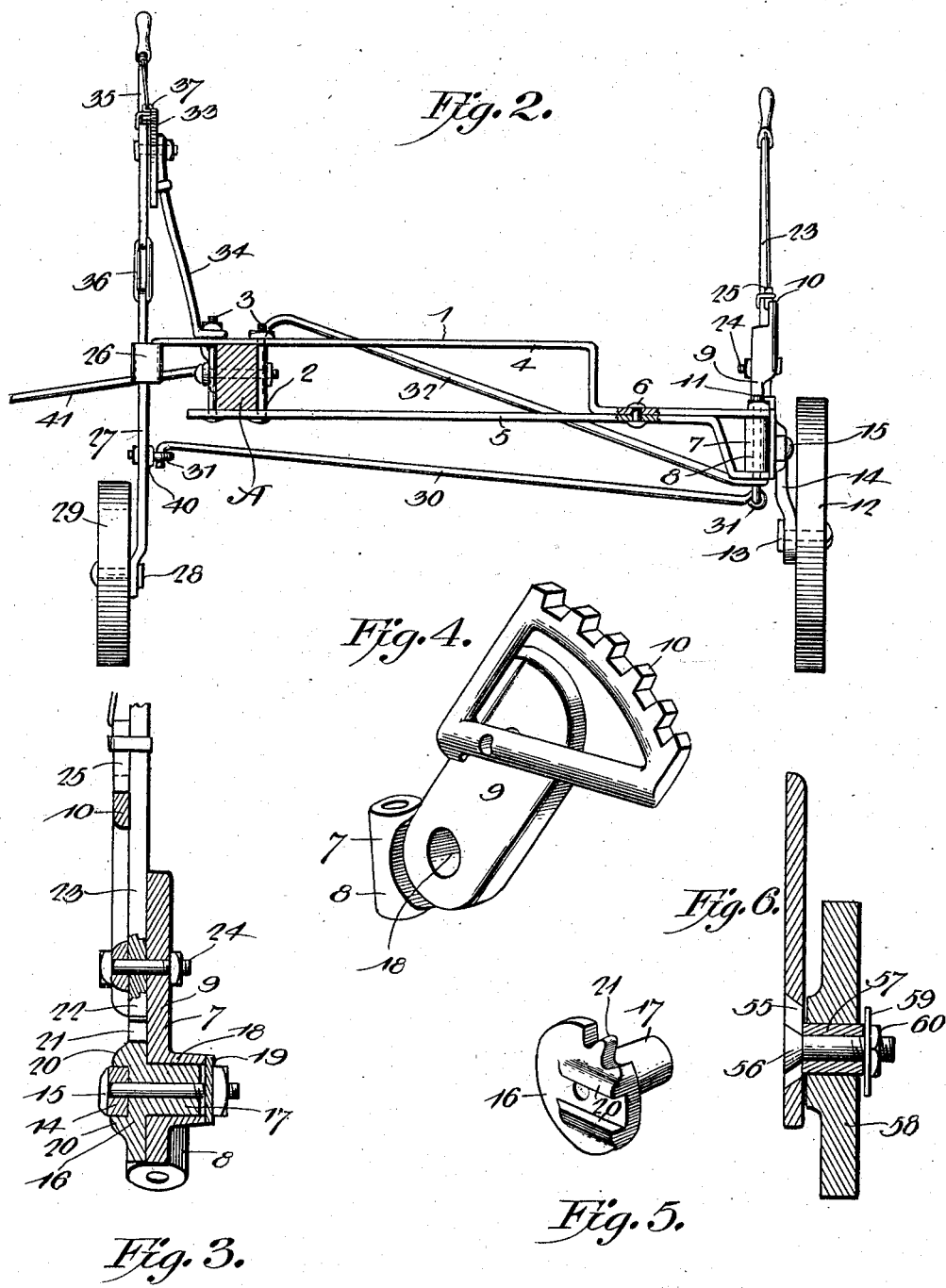

UNITED STATES PATENT OFFICE.

WILLIAM HENRY BRACKNEY, OF FLEEGAR, PENNSYLVANIA.

RIDING ATTACHMENT FOR PLOWS.

SPECIFICATION forming part of Letters Patent No. 655,846, dated August 14, 1900.

Application filed May 8, 1900. Serial No. 15,907. (No model.)

*To all whom it may concern:*

Be it known that I, WILLIAM HENRY BRACKNEY, a citizen of the United States, residing at Fleegar, in the county of Butler and State of Pennsylvania, have invented a new and useful Riding Attachment for Plows, of which the following is a specification.

My invention is an improved riding attachment for plows, one object of my invention being to provide improved means whereby an ordinary plow may be converted into a riding or sulky plow.

A further object of my invention is to provide means whereby the plow may be guided and caused to operate efficiently.

A further object of my invention is to provide means for maintaining the plow in a correct vertical position on hillsides and uneven ground.

My invention consists in the peculiar construction and combination of devices hereinafter fully set forth, and pointed out in the claims.

In the accompanying drawings, Figure 1 is a perspective view of a plow provided with my improved riding attachments. Fig. 2 is a detail front elevation of the same. Figs. 3, 4, 5, and 6 are detail views.

A yoke 1 is arranged transversely at the front end of the plow-beam and is adapted to be clamped thereto, as at 2, by clamping-bolts 3, which connect the upper and lower bars 4 5, which constitute the yoke and which are secured together at a suitable point by a bolt 6 or other suitable device. The said yoke 1 projects laterally for a considerable distance to one side of the plow-beam, and between the side ends of the bars 4 5 thereof is disposed the front portion of a connecting member 7. Said connecting member comprises a hinge-section 8, an arm 9, inclined upward therefrom rearwardly, and a segment-plate 10. Preferably said hinge-section, arm, and segment-plate are formed integrally of cast metal; but it will be understood that the same may be made separately of suitable material and secured together, if so preferred. The hinge-section 8 comprises a hollow cylinder through which extends a pivotal bolt 11, the same also extending through openings in the ends of the bars 4 5, and thereby the said connecting member is flexibly connected to the landside end of the yoke 1.

A landside-wheel 12 is journaled on the stud or bolt 13 at the rear end of the trail-bar 14. The front end of said trail-bar is pivotally connected to the connecting member 7 by a bolt 15. Interposed between the said end of the trail-bar on the said connecting member is a disk 16, having on one side a projecting bushing 17, which bears in a box 18, with which the connecting member is provided, and the pivotal bolt 15 extends through the central opening with which said disk is provided and through the bushing 17 thereof and also through a washer 19 on the outer side of the box 18. Hence the said disk 16 and the said trail-bar are firmly connected to the connecting member. The said disk 16 is provided on its outer side with offsets or lugs 20, between which the trail-bar 14 passes and is seated, and which offsets bear on upper and lower sides of the said trail-bar, and hence the disk 16 is firmly attached to the said trail-bar and is caused to turn with the latter pivotally on the bolt 15. The said disk 16 is provided on its upper side with spur-teeth 21, engaged by the spur-teeth 22 at the lower end of a lever 23, which lever is pivotally connected to the arm 9 of the connecting-lever by a bolt or in any other suitable manner, as at 24, and is provided with a suitable detent 25, adapted to engage the teeth of the sector 10, and thereby lock the said lever at any required adjustment.

It will be understood that by means of the lever 23 and the connections hereinbefore described between said lever and the trail-bar 14, which carries the trail-wheel 12, the latter may be adjusted vertically as may be required.

To that portion of the bar 4 at the landside end of the yoke 1 is secured a keeper or guide 26, in which is disposed and adapted to slide a vertical standard 27. Said standard is provided at its lower end with a spindle or bolt 28, on which is journaled a wheel 29. Said standard is connected by a brace-rod 30 to the lower end of the pivotal bolt 11, which serves to hinge the connecting member 7 to the yoke 1, flexible connections 31 being formed between the ends of the said brace-rod and the said pivotal bolt and standard 27. A brace-rod 32 also connects said bolt 11 to the plow-beam A.

A segment-plate 33 is carried by a suitable bracket or support 34, which is bolted to the yoke 1 and plow-beam A, and to said segment-plate 33 is fulcrumed a lever 35, which is connected to the standard 27 by a link 36. A detent 37, with which the lever 35 is provided, is adapted to engage the teeth of the segment-plate, and thereby lock the said lever at any required adjustment. It will be understood that by means of the said lever and the link which connects it to the standard 27 the latter may be raised and lowered with relation to the plow-beam, so as to adjust the wheel 29 vertically as may be required. The said wheel 29 being adjustable vertically and disposed at the front end of the plow-beam in advance of the plow and slightly to the landside, it will be understood that by means of said adjustable wheel and its connections the beam may be inclined, and hence the plow may be adjusted so as to run at any required depth.

A yoke 38, which is substantially identical in construction with the yoke 1, is disposed on the plow-beam slightly in rear of the standard B of the plow, is secured thereon by means of the clamping-bolts 39, and projects to the landside. The said yoke 38 is connected to the vertically-adjustable standard 27 of wheel 29 by a brace-rod 40 and is also connected to the plow-beam by means of a brace-rod 41.

A connecting member 42, which is in all respects identical with the connecting member 7, hereinbefore described, is pivotally connected or hinged to the outer end of the yoke 38 by a bolt 43. Said bolt 43 also serves to connect the rear end of the brace bar or rod 41 to the yoke 38, and the front end of said brace-rod is connected to the plow-beam by means of a bolt 44, which also serves to secure the bracket 34 to the plow-beam.

A trail-bar 45, which is identical in construction with the trail-bar 14, hereinbefore described, is connected to the connecting member 42 by a disk 46, which is identical in construction with the disk 16, hereinbefore described, and a pivotal bolt 47. A lever 48, which is fulcrumed to the arm 49 of connecting member 42, has its spur-teeth engaged with the spur-teeth of the disk 46 and is provided with a detent 50, which is adapted to engage the teeth of the sector-plate 51 of the connecting member 42. The trail arm or bar 45, which is disposed on the landside, carries a landside-wheel 52.

It will be understood from the foregoing and by reference to the drawings that by means of the levers and their connections the various wheels may be adjusted so as to adapt themselves to the character of the ground on which the plow is to be used and in such manner as to support the plow on both sides in the required position to secure the most efficient action of the plow. Hence it will be understood that by my improved riding attachments the plow is adapted for operating efficiently on slopes and hillsides and that the same may be adjusted as may be required under varying conditions. To the said yoke 38 is bolted the lower end of a spring-bar 53, which carries a seat 54 for the driver or plowman, who is thus enabled to ride upon the plow, and the said seat is disposed so that the plowman may conveniently reach and operate the various adjusting-levers as required.

It is of importance to provide a supporting wheel or roller for the heel of the landside of the plow to coact with the wheel 29 for adjusting the plow to any required angle longitudinally of the furrow and to also support the plow slightly above the ground and relieve the same of friction when the plow is being driven from one point to another and is not in operation. To this end I provide the landside-plate with a vertically-disposed slot 55 near the heel thereof, in which slot operates the flared or flanged head of a bolt 56. A sleeve 57 is disposed on the shank of the said bolt on the inside of the landside-plate, and on the said sleeve is journaled a supporting wheel or roller 58. A washer 59, which is clamped on the inner end of the sleeve 57 by the nut 60 of bolt 56, coacts with the bolt and nut to secure the bolt in the slot 55 at any desired vertical adjustment, and thereby the wheel or roller 58 may be vertically adjusted as may be required.

It will be understood that by means of the connecting members, which form hinge or pivotal joints to connect the bars or frames of the trail-wheels to the yokes which project from opposite sides of the plow-beam, said trail-wheels adapt themselves to the direction of the plow, and hence the latter may be turned at the end of a furrow as readily when provided with my improved riding attachments as when it is not so provided. The doubletree or singletree may be connected to the usual clevis C at the front end of the plow-beam in the ordinary manner or a draft-pole D may be employed. When so employed, the rear end of the draft-pole is pivotally connected to the upper side of the plow-beam, at a suitable distance from the front end thereof, by means of a yoke-bolt E, which passes around the plow-beam and is clamped thereto from the lower side, as at F, and is provided on its upper side with a projecting spindle G, which extends through a vertical opening near the rear end of the draft-pole.

Having thus described my invention, I claim—

1. In riding attachments for plows, the combination of an arm adapted to be secured to and project laterally from a plow-beam, a connecting member hinged to the said arm and adapted to swing in a horizontal plane, a trail-bar fulcrumed to said connecting member and adapted to turn in a vertical plane and carrying a trail-wheel, a lever fulcrumed to said connecting member, and connections between said lever and said trail-bar, whereby the latter may be turned to adjust the trail-wheel vertically, substantially as described.

2. In riding attachments for plows, the combination with an arm projecting from the plow-beam, of a connecting member hinged to the said arm, a plate pivotally connected to said member, a trail bar or arm secured to said plate and carrying a trail-wheel, and a lever fulcrumed to said connecting member, said lever and said plate or disk having coacting spurs or gears whereby said lever is connected to said disk or plate, for the purpose set forth, substantially as described.

3. In riding attachments for plows, a yoke-arm comprising upper and lower bars, bolts connecting said upper and lower bars and adapted to clamp the same to a plow-beam, a connecting member hinged to said yoke or arm and adapted to swing in a horizontal plane, a trail-wheel bar fulcrumed to said connecting member and adapted to turn in a vertical plane and a lever carried by said connecting member, said lever coacting with said trail-wheel bar to adjust the trail-wheel vertically, substantially as described.

4. The combination with a plow, of yoke-arms projecting from opposite sides thereof, connecting members hinged to said yoke-arms, and adapted to swing in horizontal planes, trail-bars carrying trail-wheels pivotally connected to said connecting members and adapted to turn in vertical planes, levers fulcrumed to said connecting members and connections between said levers and said trail-bars, for the purpose set forth, substantially as described.

5. The combination with a plow, of yoke-arms projecting from opposite sides thereof, connecting members hinged to said yoke-arms, trail-bars carrying trail-wheels and pivotally connected to said connecting members, levers fulcrumed to said connecting members and connections between said levers and said trail-bars, and a vertically-adjustable wheel and supports therefor at the front end of the plow-beam, substantially as described.

6. The combination with a plow, of yoke-arms projecting from opposite sides thereof, connecting members hinged to said yoke-arms, trail-bars carrying trail-wheels and pivotally connected to said connecting members, levers fulcrumed to said connecting members, connections between said levers and said trail-bars, a vertically-adjustable standard in a guide with which the yoke-arm at the front end of the plow-beam is provided, a wheel carried by said vertically-adjustable standard and a lever to adjust the latter, substantially as described.

7. As a new article of manufacture, the connecting member comprising the joint-section, the arm extending therefrom and the segment-plate carried by said arm, substantially as described.

8. The combination with the connecting member comprising the joint-section, the arm extending therefrom and the segment-plate carried by said arm, of the disk or plate having its bearing in said arm and provided with the spurs, the trail-arm seated and secured on said plate or disk and the lever fulcrumed to the arm, having the spurs engaging those of the plate or disk, to partly rotate the latter, and provided further with a detent to engage the segment-plate and thereby lock said lever to said segment-plate when adjusted, substantially as described.

In testimony that I claim the foregoing as my own I have hereto affixed my signature in the presence of two witnesses.

WILLIAM HENRY BRACKNEY.

Witnesses:
 A. M. CORNELIUS,
 J. D. McJUNKIN.